Patented Dec. 31, 1940

2,226,984

UNITED STATES PATENT OFFICE 2,226,984

ACCELERATOR OF VULCANIZATION

Arthur W. Sloan, Akron, Ohio, assignor to The B. F. Goodrich Company, New York, N. Y., a corporation of New York No Drawing. Application January 7, 1938,
Serial No. 183,837

2 Claims. (Cl. 260—455)

This invention relates to a process of vulcanization of rubber, synthetic rubber, rubber-like materials, etc., and to materials used as accelerators of the vulcanizing process.

The object of the invention is to bring about the vulcanization at a rapid rate even at moderate temperatures, at the same time not increase the tendency of the unvulcanized mass to prevulcanize, and to give vulcanizates which age well. The materials herein described can also be used in the vulcanization of rubber and the like with large proportions of sulfur to produce hard rubber or ebonite.

I have found that compounds of the formula R—N=CX$_2$, where R is an aliphatic radical or an aromatic radical, and X is one of the halogens, will undergo a condensation reaction with mercapto compounds in general, or their salts, such as ammonium, quaternary ammonium, sodium, zinc, etc., salts, in aqueous suspension or solution, to form products of the desired type. Probably the reactions are of the type shown by the equation:

where A is an organic group and M is hydrogen or a salt-forming group. The dithiocarbamic acids, and their salts, the mercaptothiazoles and their salts, and the mercapto quinolines and their salts, are examples of the materials which react with the halogen compounds to give products which are accelerators. These products can be considered as being the mixed anhydrides of substituted imino dithiocarbonic acids with mercapto acids.

Some of the products are not sufficiently stable to be practically useful as accelerators of vulcanization, since during the reaction, or during purification or storage they tend to decompose, losing, sometimes a carbylamine, and sometimes an iso thiocyanate. In these cases, the products remaining are disulfides or monosulfides. The decomposition reactions are probably of the types illustrated by the equations:

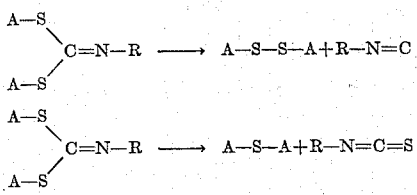

Where these decomposition reactions do take place, the method is good for the preparation of the mono or di-sulfide in high yield.

Many of the products of the condensation reaction described above are quite stable. Such for example are obtained by reacting the sodium salt of mercaptobenzothiazole in aqueous solution with phenyl imino carbon dichloride, or the sodium salt of 2-mercaptoquinoline with phenyl imino carbon dichloride, or the sodium salt of bis (aryl tetrahydro beta-naphthyl) dithiocarbamic acid with phenyl imino carbon dichloride. These products are extremely useful as accelerators of vulcanization.

The condensation reaction outlined above appears to be quite general in that substituted imino carbon dihalides (especially chlorides and bromides) in which the substituent may be not only phenyl, but tolyl, xenyl, naphthyl, anisyl, benzyl, or even an aliphatic group such as ethyl, propyl or the like will condense with mercapto acids (or their simple salts) including thiol carboxylic acids such as dithiofuroic or dithio benzoic acids, thiol carbonic acids such as butyl xanthogenic acid, thiol carbamic acids such as substituted dithiocarbamic acids (preferably those in which both free valencies of the nitrogen are occupied by organic radicals such as alkyl or aryl radicals), and mercapto heterocyclic bases such as 2-mercapto quinoline, 2-mercapto thiazole, mercapto thiodiazole, mercapto thiazine and the like; and the resulting condensation products greatly accelerate the vulcanization of rubber. It will be understood that suitable substituents, preferably hydrocarbon substituents or those not differing greatly in effect from hydrocarbon substituents, may be present in any case. Thus, in place of mercapto thiazole, any of the following may be employed: mercapto methyl-thiazole, mercapto dimethyl-thiazole, mercapto ethyl thiazole, mercapto phenyl-thiazole, mercapto benzothiazole, mercapto methyl-benzol thiazole, mercapto methoxybenzothiazole, mercapto naphthothiazole and the like.

The preparation of phenylimino carbon dichloride by reacting phenyl isothiocyanate with chlorine in the presence of chloroform has been described by Nef, in Liebigs Ann. 270, 284 (1892) and by Sell and Zierold, in Ber. 7, 1228 (1874); also by Nef, in Liebig's Ann. 270, 282, by the reaction of phenyl isocyanide with chlorine; and by A. W. Hofmann, in Ber. 12, 1127 (1879), by the reaction of phenyl mustard oil with phosphorus pentachloride.

I have found that phenyl mustard oil can be made to react with chlorine very easily, merely by passing the chlorine gas through the liquid mustard oil maintaining the temperature at 48°–50° C. Besides the phenylimino carbon dichloride, there are formed sulfur monochloride and sulfur dichloride, the ratio of these depending upon the amount of chlorine used. They are lower boiling than the phenylimino carbon dichloride, and can be removed by distillation. The product itself can be distilled, but in general can be used in the crude state after removal of the sulfur chlorides.

Phenylimino carbon dichloride is a high boiling heavy liquid, almost colorless when pure. It has a corrosive action on the skin, and is a bad lachrymator, so that it must be handled carefully. It reacts slowly with water, but in the dry state it can be safely stored in glass containers. Similar compounds can be made from other mustard oils.

As an example of its reaction with the sodium salt of mercaptobenzothiazole the following experiment may be cited. 33.4 g. of mercaptobenzothiazole were dissolved in a solution of 8.0 g. of sodium hydroxide in 8 cc. of water and 110 cc. of denatured alcohol. To this solution, at 20–25° C., there was added with stirring, and during 15–20 min., 17.4 g. of phenylimino carbon dichloride. The product separated at once as a yellow, finely divided solid. It was filtered off, washed with water, and dried. The weight was 36.6 g. representing a yield of 84%. M. P. 140°–144° C.

As a further example, the reaction of phenyl imino carbon dichloride with the sodium salt of bis(aryl tetrahydro beta-naphthyl) dithiocarbamic acid may be cited. 18.2 g. of sodium bis (aryl tetrahydrobeta-naphthyl) dithiocarbamate were dissolved in 200 cc. of denatured alcohol. To this solution, at 30°–35° C., there were added with stirring, during 1 hour, 4.8 g. of phenyl imino carbondichloride. The product separated at once, as an orange colored, finely divided solid. It was filtered off, washed with water, and dried. The weight was 11.3 g., representing a yield of 58%. M. P. 78°–81° C. Other dithiocarbamates and particularly diaryl dithiocarbamates may be substituted for the reagent employed in this example.

As a further example, the reaction of phenyl imino carbon dichloride with the sodium salt of 2-mercapto 4.5-dimethyl thiazole may be cited. 29.0 g. of the thiazole were dissolved in 100 cc. of denatured alcohol containing a solution of 8 g. of sodium hydroxide in 10 cc. of water. To this solution at 25°–30° C. there were added with stirring, during 20 min., 10 g. of phenyl-imino carbon dichloride. Salt began to separate immediately, and soon the product precipitated. After stirring for an hour, and allowing to stand for several hours, the product was filtered off, washed with alcohol, then with water, and dried. The weight was 22 g. representing a yield of 98%. M. P. 123°–126° C.

When a rubber composition (A) containing rubber 100 parts, zinc oxide 10 parts, sulfur 3.5 parts, blanc fixe 40 parts, stearic acid 1 part, and bis (benzothiazyl mercapto) phenylimino-dithiocarbonic anhydride 0.5 part was heated under pressure in a mold for 120 min. at 260° F., the vulcanized composition had a tensile strength 3160#/sq. in. and an ultimate elongation of 750%.

When in a similar mixture (B), the above accelerator was replaced by 0.2 part of di bis(tetrahydro beta naphthyl) dithiocarbamic phenylimino-dithiocarbonic anhydride, and the composition vulcanized for 30 min. at 260° F., the vulcanized product had a tensile strength of 3365#/sq. in. and an ultimate elongation of 770%.

In a similar mixture (C), the above accelerator was replaced by 0.5 part of bis (4.5 dimethylthiazyl 2-mercapto) phenylimino-dithiocarbonic anhydride. When this composition was vulcanized for 1 hr. at 287° F., the vulcanized product had a tensile strength of 3375#/sq. in., and an ultimate elongation of 790%.

None of the above compositions showed any tendency to vulcanize in 30 min. at 220° F.

When to mixture C, 0.05 part of a polybutyraldehyde-aniline accelerator was added, the composition vulcanized in 30 min. at 260° F. to give a tensile of 4020#/sq. in., and an ultimate elongation of 815%.

When stock A was aged for 96 hours in an oxygen bomb at 70° C. and 300# pressure, the aged sample still had a tensile strength of 2325#/sq. in., and an ultimate elongation of 670%.

The examples given are merely illustrative of the large number of materials which belong to the class described, and of their usefulness as accelerators, and are not intended to place a limit upon the claims of this invention.

The use of the term "rubber", is meant to include caoutchouc, balata, gutta-percha, synthetic rubber, or natural or artificially prepared latex.

It is to be understood that the accelerators may be used in admixture with other accelerators, with antioxidants, softeners, pigments, fillers, etc., and that the rubber may be vulcanized with these accelerators in other ways than that particularly set forth above; specifically, it may be vulcanized in hot air, steam, hot water, etc.

In the following claims the term acid and the names of specific types of acid will be employed in a generic sense to include the free acids and their salts, since they enter into the condensation reaction in essentially the same manner.

I claim:

1. The condensation product of phenylimino carbon dichloride with a disubstituted dithiocarbamic acid.

2. The condensation product of phenylimino carbon dichloride with bis (ar-tetrahydro beta-naphthyl) dithiocarbamic acid.

ARTHUR W. SLOAN.